United States Patent
Zaidi

(10) Patent No.: US 10,962,642 B2
(45) Date of Patent: Mar. 30, 2021

(54) METHOD AND APPARATUS FOR RADAR INFRASTRUCTURE

(71) Applicant: Metawave Corporation, Palo Alto, CA (US)

(72) Inventor: Abdullah Ahsan Zaidi, San Diego, CA (US)

( * ) Notice: Subject to any disclaimer, the term of this patent is extended or adjusted under 35 U.S.C. 154(b) by 0 days.

(21) Appl. No.: 16/556,188

(22) Filed: Aug. 29, 2019

(65) Prior Publication Data

US 2020/0072969 A1    Mar. 5, 2020

Related U.S. Application Data

(60) Provisional application No. 62/724,172, filed on Aug. 29, 2018.

(51) Int. Cl.

| | |
|---|---|
| *G01S 13/931* | (2020.01) |
| *G08G 1/01* | (2006.01) |
| *G01S 13/91* | (2006.01) |
| *G01S 13/42* | (2006.01) |
| *G01S 13/62* | (2006.01) |
| *G08G 1/16* | (2006.01) |

(52) U.S. Cl.
CPC ............ *G01S 13/931* (2013.01); *G01S 13/42* (2013.01); *G01S 13/62* (2013.01); *G01S 13/91* (2013.01); *G08G 1/0116* (2013.01); *G01S 2013/9316* (2020.01); *G08G 1/162* (2013.01); *G08G 1/166* (2013.01)

(58) Field of Classification Search
None
See application file for complete search history.

(56) References Cited

U.S. PATENT DOCUMENTS

| | | | |
|---|---|---|---|
| 10,205,457 B1* | 2/2019 | Josefsberg | G01S 7/032 |
| 2016/0061935 A1 | 3/2016 | McCloskey et al. | |
| 2019/0179023 A1* | 6/2019 | England | G01S 7/4817 |

(Continued)

OTHER PUBLICATIONS

S. Patole, et al., "Automotive Radars: A Review of Signal Processing Techniques," Signal Processing for Smart Vehicle Technologies: Part 2, in IEEE Signal Processing Magazine, pp. 22-35, Mar. 2017.

(Continued)

*Primary Examiner* — Whitney Moore
(74) *Attorney, Agent, or Firm* — Sandra Lynn Godsey

(57) ABSTRACT

Examples disclosed herein relate to a radar warning system positioned in a highway infrastructure. The infrastructure element includes a radar unit that is configured to produce radar data from one or more return radio frequency (RF) beams reflected from a surrounding environment using one or more steerable RF beams radiated to the surrounding environment, detect a moving object in a path of the surrounding environment from the radar data, determine whether the moving object in the path is violating directional criteria, and generate an alert message notifying one or more receiving units to avoid the path of the moving object when the moving object in the path is violating the directional criteria. The infrastructure element also includes a communication unit coupled to the radar unit and configured to send the alert message to the one or more receiving units in the surrounding environment.

20 Claims, 9 Drawing Sheets

(56) References Cited

U.S. PATENT DOCUMENTS

2019/0287394 A1* 9/2019 Aoude .............. G08G 1/0129

OTHER PUBLICATIONS

P. Molchanov, "Radar Target Classification by Micro-Doppler Contributions," Thesis for the degree of Doctor of Science in Technology, Tampere University of Technology, Tampere, Finland, Publication 1255, pp. 1-187, Oct. 2014.

S. Haykin, "Radar Vision," IEEE International Conference on Radar, Arlington, VA, pp. 585-588, May 1990.

F. Bu, et al., "Pedestrian Detection in Transit Bus Application: Sensing Technologies and Safety Solutions," IEEE Proceedings, Intelligent Vehicles Symposium, Las Vegas, NV, pp. 100-105, Jun. 2005.

L. Danielsson, "Tracking and Radar Sensor Modelling for Automotive Safety Systems," Department of Signals and Systems, Signal Processing Group, Chalmers University of Technology, Gothenburg, Sweden, pp. 1-102, 2010.

D. Belgiovane, "Millimeter-Wave Automotive Radar: Background Theory, State-of-the-Art, and Vulnerabilities," IEEE MTT-S International Microwave Symposium, Philadelphia, PA, Slides 1-41, Jun. 2018.

R. Rouveure, et al., "Radar Imager for Perception and Mapping in Outdoor Environments," Advanced Concepts for Intelligent Vision Systems: 11th International Conference (ACIVS), Bordeaux, France, Sep. 2009, pp. 618-628.

S. Carpenter, "Autonomous Vehicle Radar: Improving Radar Performance with Simulation," White Paper, High Frequency/ Electronics Business Unit, Ansys, Canonsburg, PA, pp. 1-14, 2017.

S. Milch, et al., "Pedestrian Detection with Radar and Computer Vision," Smart Microwave Sensors GmbH, Braunschweig, Germany, pp. 1-7, 2001.

D. Kissinger, "Radar Fundamentals," in Millimeter-Wave Receiver Concepts for 77 GHz Automotive Radar in Silicon-Germanium Technology, SpringerBriefs in Electrical and Computer Engineering, pp. 9-19, 2012.

R. W. Heath Jr., "Cars communicating: Automotive Applications of 5G and Millimeter Wave," Wireless Networking and Communications Group, Department of Electrical and Computer Engineering, The University of Texas at Austin, Slides 1-29, 2016.

D. Langer, "An Integrated MMW Radar System for Outdoor Navigation," Ph.D. dissertation, The Robotics Institute, Carnegie Mellon University, Pittsburgh, PA, Jan. 1997.

A. Bartsch, et al., "Pedestrian Recognition Using Automotive Radar Sensors," Advances in Radio Science, 10:45-55, 10.5194/ars-10-45-2012, Munich, Germany.

* cited by examiner

METHOD AND APPARATUS FOR RADAR INFRASTRUCTURE

CROSS-REFERENCE TO RELATED APPLICATIONS

This application claims priority from U.S. Provisional Application No. 62/724,172, filed on Aug. 29, 2018, and incorporated by reference in its entirety.

BACKGROUND

A highway system provides drivers with high speed access to geographically dispersed areas at the risk of high-speed traffic with many other commuters. The system runs smoothly when drivers follow traffic rules and drive in proper designated lanes. Accidents often occur when a driver is not obeying the rules, such as when a driver is under the influence of drugs or alcohol or when a driver takes a wrong turn due to bad weather and low visibility. There are a variety of situations that result when a vehicle is traveling on the wrong side of a road or highway. The ability to identify these situations and provide a warning or alert to other drivers would reduce the loss of life and damage from these unfortunate occurrences.

BRIEF DESCRIPTION OF THE DRAWINGS

The present application may be more fully appreciated in connection with the following detailed description taken in conjunction with the accompanying drawings, which are not drawn to scale and in which like reference characters refer to like parts throughout, and wherein.

DETAILED DESCRIPTION

Figure 1:
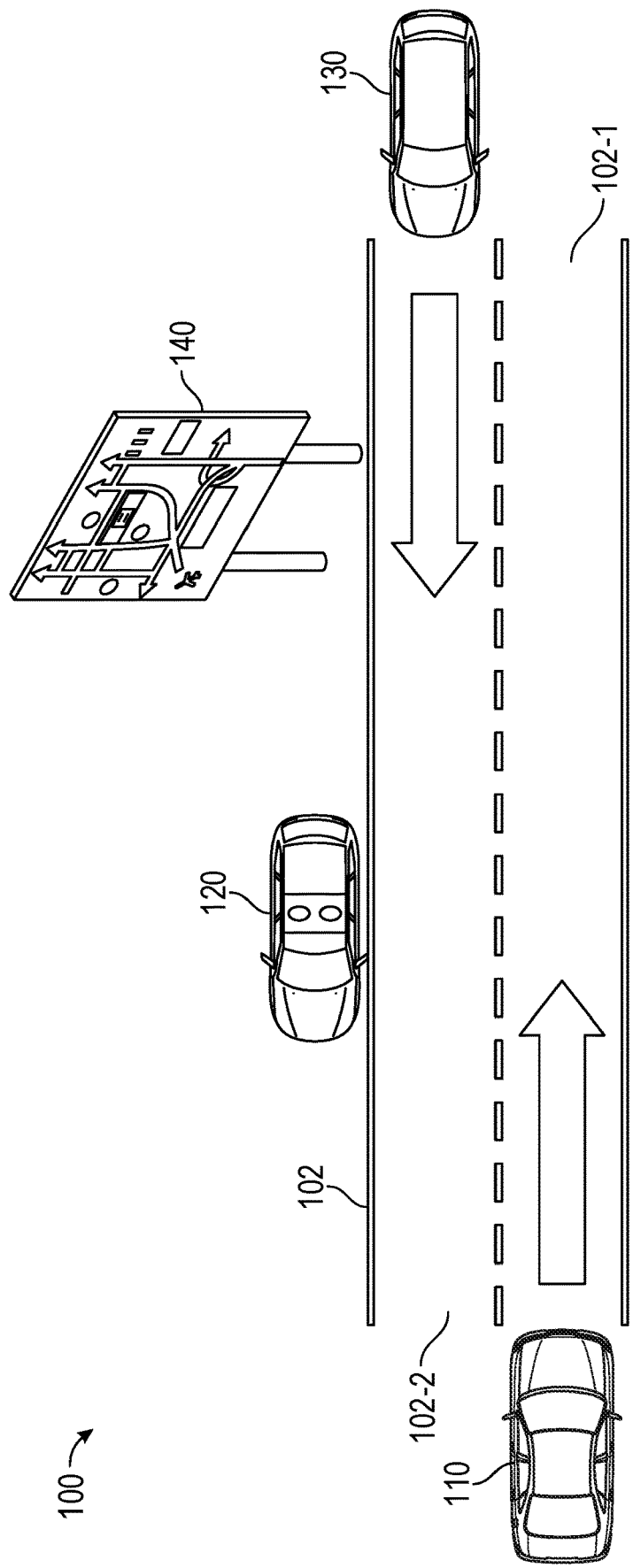
FIG. 1 illustrates a driving environment incorporating a warning system for detecting a traffic hazard, according to various implementations of the subject technology.

The present disclosure provides methods and apparatuses to detect driving violations and send a control signal warning drivers and alerting authorities. There are many applications for these solutions, and some implementations of the disclosure are illustrated in a radar system positioned within a driving environment and may be positioned in a stationary infrastructure or in a vehicle associated with a network of vehicles.

The subject technology supports autonomous driving with improved sensor performance, all-weather/all-condition detection, advanced decision-making algorithms and interaction with other sensors through sensor fusion. These configurations optimize the use of radar sensors, as radar is not inhibited by weather conditions in many applications, such as for self-driving cars. The ability to capture environmental information early aids control of a vehicle, allowing anticipation of hazards and changing conditions. The sensor performance is also enhanced with these structures, enabling long-range and short-range visibility to the controller. In an automotive application, short-range is considered within 30 meters of a vehicle, such as to detect a person in a cross walk directly in front of the vehicle; and long-range is considered to be 250 meters or more, such as to detect approaching cars on a highway. The present disclosure provides for automotive radar sensors capable of reconstructing the world around them and are effectively a radar "digital eye," having true 3D vision and capable of human-like interpretation of the world.

The subject technology is applicable in wireless communication and radar applications, and in particular those incorporating meta-structures capable of manipulating electromagnetic (EM) waves using engineered radiating structures. For example, the present disclosure provides for antenna structures having meta-structure elements and arrays. A meta-structure (MTS), as generally defined herein, is an engineered, non- or semi-periodic structure that is spatially distributed to meet a specific phase and frequency distribution. In some implementations, the meta-structures include metamaterials. There are structures and configurations within a feed network to the metamaterial elements that increase performance of the antenna structures in many applications, including vehicular radar modules. Additionally, the present disclosures provide methods and apparatuses for generating wireless signals, such as radar signals, having improved directivity and reduced undesired radiation patterns aspects, such as side lobes. The present disclosures provide antennas with unprecedented capability of generating RF waves for radar systems. The present disclosure provides improved sensor capability and support autonomous driving by providing one of the sensors used for object detection. The present disclosure is not limited to these applications and may be readily employed in other antenna applications, such as wireless communications, 5G cellular, fixed wireless and so forth.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology. In other instances, well-known methods and structures may not be described in detail to avoid unnecessarily obscuring the description of the examples. Also, the examples may be used in combination with each other.

FIG. 1 illustrates a driving environment 100 incorporating a warning system for detecting a traffic hazard, according to various implementations of the subject technology. The driving environment 100 includes a roadway 102 that has multiple lanes, namely a first lane 102-1 and a second lane 102-2. For example, the first lane 102-1 carries traffic moving right-to-left and the second lane 102-2 carries traffic moving left-to-right. The driving environment 100 includes an infrastructure element 140 positioned proximate to the roadway 102. The infrastructure element 140 may be a roadway sign mounted to one or more vertical poles, an overpass structure that extends over one or more lanes of the roadway 102, a bridge, or the like. In some aspects, the infrastructure element 140 is positioned at a side of a road or highway, such as on a shoulder next to the roadway 102. In other aspects, the infrastructure element 140 is positioned over and above the roadway 102.

The infrastructure element 140 includes a radar unit (not shown) that can emit EM radiation toward the roadway 102 to scan a proximate area of the roadway 102 and detect stationary and moving objects, and more specifically, to identify vehicles traveling opposite to the designated direction of travel. The radar unit detects a moving vehicle as a function of the velocity of the vehicle.

The radar signal uses a modulation scheme that enables determination of the vehicle's velocity and location, such as by a modulated transmitter signal. In some aspects, the radar unit can generate a specific transmission signal, such as a Frequency Modulated Continuous Wave (FMCW) signal, which is used for radar sensor applications as the transmitted signal is modulated in frequency, or phase. The FMCW signal enables radar to measure range to an object by measuring the phase differences in phase or frequency between the transmitted signal and the received signal, or reflected signal. Other modulation types may be incorporated according to the desired information and specifications of a system and application. Within FMCW formats, there are a variety of modulation patterns that may be used within FMCW, including sinusoidal, triangular, sawtooth, rectangular and so forth, each having advantages and purposes. For example, sawtooth modulation may be used for large distances to a target; a triangular modulation enables use of the Doppler frequency, and so forth.

As depicted in FIG. 1, vehicles 110 and 130 are traveling in opposite directions on their respective lanes 102-1 and 102-2. In some aspects, a police car 120 is in a stationary position proximate to the roadway 102. Each of the vehicles, namely the vehicles 110, 130 and the police car 120, may include a communications module that is configured to receive a communication signal from the infrastructure element 140. The communication signal may include one or more messages relating to a traffic hazard or emergency condition on the roadway 102. In this respect, the vehicle 110 may receive a message indicating the location of the vehicle 130 and the traffic condition of the roadway 102, and conversely, the vehicle 130 may receive a similar message indicating the location of vehicle 110 including the traffic condition. The police car 120 may receive a message indicating the locations of vehicles 110, 130 and the traffic condition of the roadway 102. The traffic condition included in the message may indicate the velocity of a vehicle relative to the infrastructure element 140, such as a compliant velocity or a non-compliant velocity. In some aspects, the Doppler shift is negative for a target moving away from a radar unit, and the Doppler shift is positive for a target moving toward the radar unit. In this respect, a moving object may have a compliant velocity or a non-compliant velocity depending on the expected Doppler shift. In some implementations, if the expected Doppler shift is positive, a compliant velocity indicates proper compliance with traffic rules, and a non-compliant velocity indicates a violation of the traffic rules. As used herein, the term "compliant velocity" may refer to "non-negative velocity," and the term "non-compliant velocity" may refer to "negative velocity." The velocity serves as a directional indicator and may be considered a binary decision. The expected Doppler shift may vary depending on which traffic lane of a roadway the radar unit is detecting and its expected directional criteria.

Figure 2:
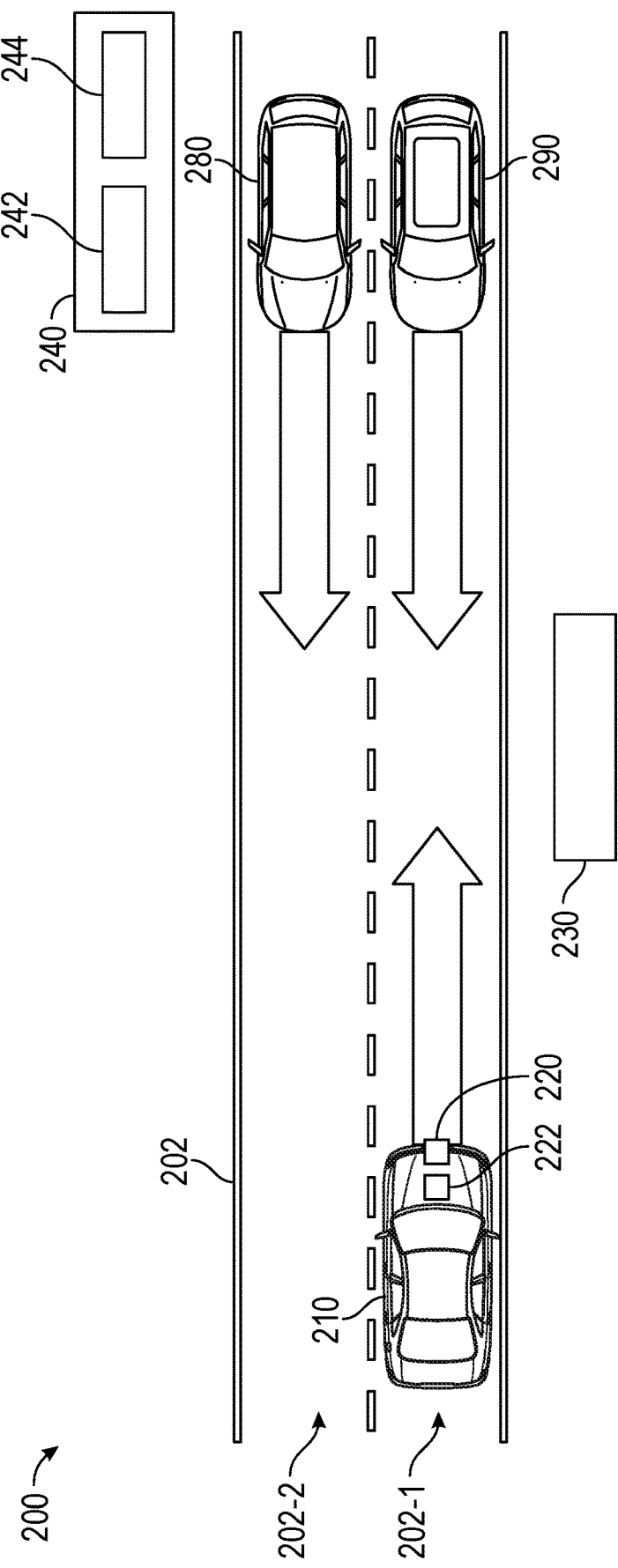
FIG. 2 conceptually illustrates a traffic hazard in the driving environment of FIG. 1, according to various implementations of the subject technology.

FIG. 2 conceptually illustrates a traffic hazard in a driving environment 200, according to various implementations of the subject technology. As illustrated in FIG. 2, the driving environment 200 includes a roadway 202 that has multiple lanes, namely a first lane 202-1 and a second lane 202-2. For example, the first lane 202-1 carries traffic moving right-to-left and the second lane 202-2 carries traffic moving left-to-right. The driving environment 200 includes an infrastructure element 240 positioned proximate to the roadway 202. The infrastructure element 240 includes a radar unit 242 and a communication unit 244.

In various examples, vehicles 210 and 280 are traveling on separate lanes (e.g., lanes 202-1, 202-2) in opposite directions of the roadway 202. The scenario of FIG. 2 conceptually illustrates a traffic hazard, where at least one vehicle is traveling in a wrong direction. For example, vehicle 290 is traveling on a same lane as that of vehicle 210, namely lane 202-1, and in opposite directions. In this respect, vehicle 290 is on a collision course with vehicle 210.

In various examples, the vehicle 210 is an autonomous vehicle having multiple perception sensors capable of capturing real-world perception data about its path and surrounding environment, including radar, lidar, camera, and so forth. Each one of the perception sensors may have different range and resolution capabilities. As illustrated in FIG. 2, the vehicle 210 includes a radar unit 220, among others. The vehicle 210 may include a sensor fusion module (not shown) that combines data from different perception sensors in the vehicle 210 and data received from perception sensors in other geographically disparate autonomous vehicles including infrastructure elements to perceive its environment more accurately and enhance target detection and identification. This information may include information such as congestion on a highway, road conditions, and other conditions that would impact the sensors, actions or operations of the vehicle. As used herein, the term "autonomous vehicle" may refer to an autonomous transport machine for transporting one or more passengers independent of any, if not at least partial, control by any one of the passengers.

In some implementations, the radar unit 220 can provide a 360° true 3D vision and human-like interpretation of the surrounding environment. The radar unit 220 is capable of shaping and steering radio frequency ("RF") beams in all directions in a 360° field-of-view ("FoV") and recognizing targets quickly with a high degree of accuracy over a short range of around 300 meters or less and over a long range of around 300 meters or more. Target detection and identification by the vehicle 210 is also enhanced with the sensor fusion module using data received from an infrastructure element, such as the infrastructure element 240.

In operation, the radar unit 242 generates and transmits FMCW radar signals and receives echoes or reflections from objects in the driving environment 200. The radar unit 242 can detect vehicles traveling in a wrong direction, such as vehicle 290. The ability to detect such vehicle operation enables the infrastructure element 240 to warn other drivers and vehicles on the roadway 202. The infrastructure radar system 242 communicates with vehicles within the driving environment 200, such as vehicle 210 having a communication unit 222 positioned within. In some aspects, the communication unit 244 and the communication unit 222 communicate via a wireless communication network, such as 5G cellular network, and/or a wireless communication protocol, such as Wireless LAN (IEEE 802.11) or Bluetooth (IEEE 802.15). The communication unit 222 receives a warning indicator from the infrastructure element 240 when an emergency situation is identified. For example, vehicle 210 may receive information from the infrastructure element indicating traveling information about the vehicle 290 (e.g., direction, velocity, distance from vehicle 210, roadway lane, or the like). In some aspects, the information includes radar data obtained by the infrastructure element 240 that the vehicle 210 can process with its sensor fusion module. Such warning enables vehicle 210 to steer out of the way of an on-coming vehicle (e.g., vehicle 290), and enables vehicle 280 to reduce its velocity or continue traveling while out of the way of vehicle 290.

In some implementations, other infrastructure elements, such as infrastructure element 230, may also include a radar and communication unit (not shown). The infrastructure elements 240, 230 are positioned to provide maximum radar coverage of the roadway 202. In some aspects, the infrastructure element 240 may communicate with the infrastructure element 230 via the communication unit 244. In this respect, the infrastructure elements 230 and 240 may exchange messages and/or radar data with respect to received reflections from the roadway 202. In other aspects, the infrastructure element 230 may communicate with vehicles traveling on the roadway 202, including the vehicle 210.

Figure 3:
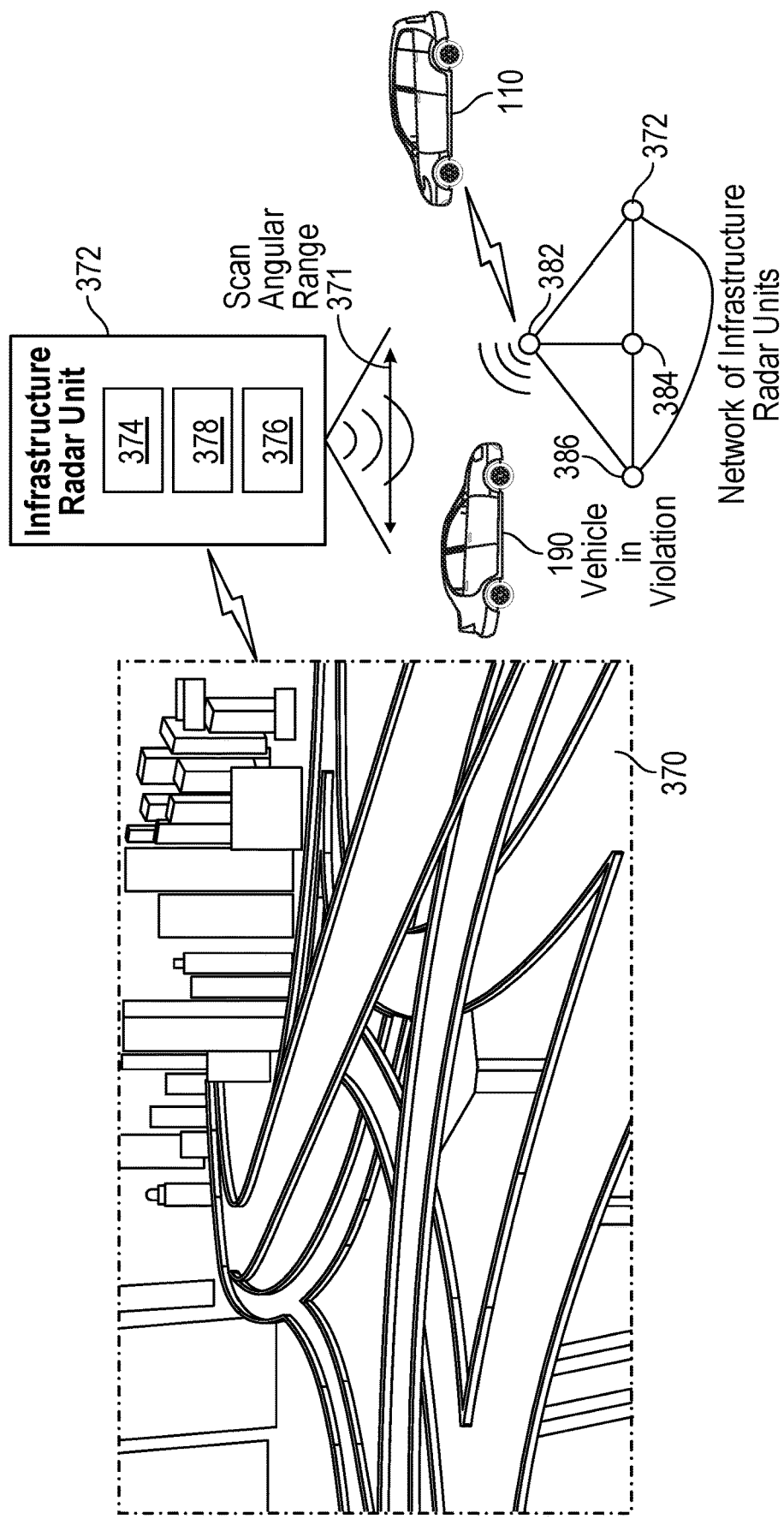
FIG. 3 illustrates a complex of roadways and entrances to a highway including infrastructure elements, according to various implementations of the subject technology.

FIG. 3 illustrates a complex of roadways and entrances to a highway including infrastructure elements, according to various implementations of the subject technology. The infrastructure elements can serve as locations, where an infrastructure radar unit 372 may be positioned. A complex configuration of radar units in infrastructure elements enables communication of signals and warnings throughout a driving environment. The radar units are positioned on or within infrastructure elements, and the infrastructure elements may be positioned on overpasses, buildings, bridges and so forth. The infrastructure elements with the radar units may be positioned at entries to highways, such as entry ramp 370, to identify a vehicle traveling in the wrong direction and provide advance notice to other vehicles traveling along the same path as early as possible.

The infrastructure radar unit 372 includes an antenna 376, a transceiver module 378 and an antenna controller 374. The antenna 376 can radiate dynamically controllable and highly-directive RF beams using meta-structures. In some implementations, the meta-structures include metamaterials. The transceiver module 378 is coupled to the antenna 376, and prepares a signal for transmission, such as a signal for a radar device. In some aspects, the signal is defined by modulation and frequency. The signal is provided to the antenna 376 through a coaxial cable or other connector and propagates through the antenna structure for transmission through the air via RF beams at a given phase, direction, and so on. The RF beams and their parameters (e.g., beam width, phase, azimuth and elevation angles, etc.) are controlled by antenna controller 374.

The RF beams reflect from targets in the surrounding environment, and the RF reflections are received by the transceiver module 378. Radar data from the received RF beams is provided to a perception engine (not shown) for target detection and identification. The radar data may be organized in sets of Range-Doppler (RD) map information, corresponding to four-dimensional (4D) information that is determined by each RF beam reflected from targets, such as azimuthal angles, elevation angles, range, and velocity. The RD maps may be extracted from FMCW radar signals and may contain both noise and systematic artifacts from Fourier analysis of the radar signals. The perception engine may control further operation of the infrastructure radar unit 372 by, for example, providing an antenna control signal containing beam parameters for the next RF beams to be radiated from the cells in the antenna 376.

In operation, the antenna controller 374 is responsible for directing the antenna 376 to generate RF beams with determined parameters such as beam width, transmit angle, and so on. The antenna controller 374 may, for example, determine the parameters at the direction of the perception engine, which may at any given time determine to focus on a specific area of an FoV upon identifying targets of interest in the surrounding environment. The antenna controller 374 determines the direction, power, and other parameters of the RF beams and controls the antenna 376 to achieve beam steering in various directions within a scan angular range 371. The antenna controller 374 also determines a voltage matrix to apply to phase shifter elements coupled to the antenna 376 to achieve a given phase shift. In some examples, the antenna 376 is adapted to transmit a directional beam through active control of the reactance parameters of the individual cells that make up the antenna 376. Next, the antenna 376 radiates RF beams having the determined parameters within the scan angular range 371. The RF beams are reflected from targets in and around the surrounding environment (e.g., in a 360° field of view) and are received by the transceiver module 378 in infrastructure radar unit 372.

In some implementations, the complex of roadways may include a network of infrastructure radar units, where each radar unit may communicate with other radar units of the network. In some aspects, the network includes a mesh network of radar units. The network of infrastructure radar units includes infrastructure radar units 372, 382, 384, and 386. The infrastructure radar units 372, 382, 384, and 386 may be located in separate infrastructure elements. In some implementations, the infrastructure radar units 372, 382, 384, and 386 may communicate with one another through one or more wireless communication protocols, such as wireless LAN (IEEE 802.11), cellular 5G, Bluetooth (IEEE 802.15), ad-hoc network such as a vehicle-to-vehicle (V2V) communication network or vehicle-to-everything (V2X) communication network, a Dedicated Short Range Communication (DSRC) network, a Wireless Access in Vehicular Environment (WAVE) network, or the like.

Figure 4:
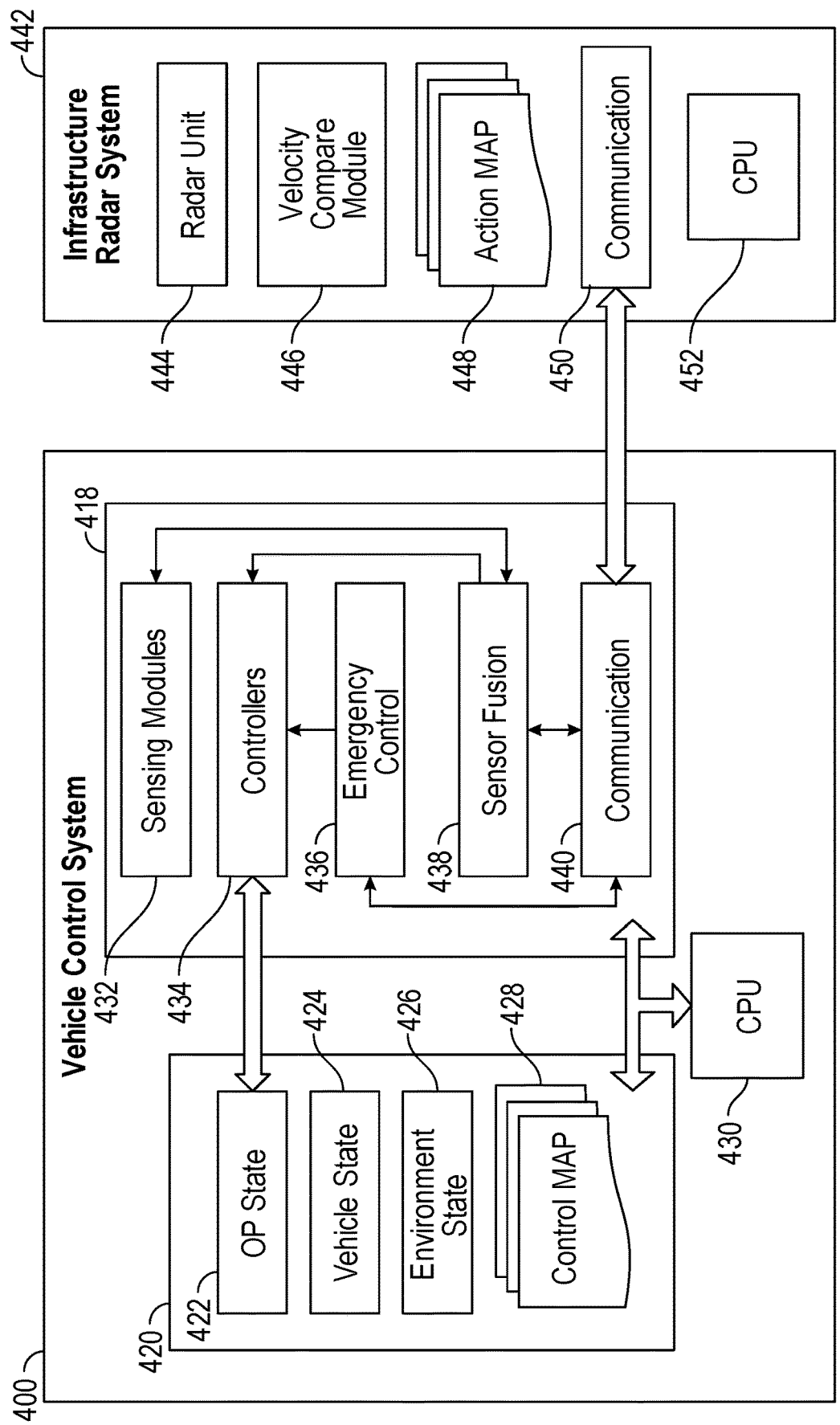
FIG. 4 illustrates a vehicle control system and an infrastructure radar system, according to various implementations of the subject technology.

FIG. 4 illustrates a schematic diagram of a vehicle control system 400 and an infrastructure radar system 442, according to various implementations of the subject technology. Not all of the depicted components may be used, however, and one or more implementations may include additional components not shown in the figure. Variations in the arrangement and type of the components may be made without departing from the scope of the claims set forth herein. Additional components, different components, or fewer components may be provided.

The vehicle control system 400 includes a communication unit 418, a vehicle state and map unit 420, and a central processing unit 430. The central processing unit 430 can process data exchanged between the communication unit 418 and the vehicle state and map unit 420. The communication unit 418 includes sensing modules 432, controllers 434, emergency control 436, sensor fusion 438, and a communication module 440. The sensing modules 432 can determine objects in an environment. The sensor fusion 438 can combine information from various sensors on the vehicle and determine actions that are implemented by the controllers 434. The communication module 440 can receive communications from the infrastructure radar system 442 and send this information to the emergency control 436, which then sends signals to the controllers 434.

The vehicle state and map unit 420 includes a set of state information modules, including operational state module 422, a vehicle state module 424, an environment state module 426 and a control map 428. The operational state module 422 can describe the current operational mode of a vehicle (e.g., vehicle 110). The vehicle state module 424 indicates the parameters defining such operation of the vehicle. The environment state module 426 indicates the objects in the environment and the velocity of these objects. The control map 428 can map indicator signals to control actions, such as when a warning signal is received from infrastructure element(s), and the signal is mapped to a preventative action such as to warn the driver or direct the vehicle to change its travel path and steer the vehicle away from danger.

The infrastructure radar system 442 includes a radar unit 444, a velocity compare module 446, an action map 448, a communication module 450, and a central processing unit 452. The radar unit 444 may include an antenna module (not shown) that provides dynamically controllable and steerable beams that can focus on one or multiple portions of a 360° FoV of the vehicle. The beams radiated from the antenna module are reflected from targets in the surrounding environment and received and processed by the radar unit 444 to detect and identify the targets. The radar unit 444 may include a perception module (not shown) that is trained to detect and identify targets and control the antenna module as desired. The velocity compare module 446 can perform a comparison between the detected velocity of a vehicle and a predetermined threshold to determine whether the detected vehicle velocity is a non-negative velocity or a negative velocity. In some aspects, the velocity compare module 446 may compare the detected velocity to multiple thresholds. In other aspects, the velocity compare module 446 may compare the detected velocity to a threshold that corresponds to a highest priority preventative action. In this respect, the radar unit 444 may issue an alert message without the need to confirm the velocity of the vehicle given that the detected velocity may have exceeded a high velocity threshold. The action map 448 can determine an action corresponding to velocity measures of an object. In some aspects, the action map 448 may include multiple actions mapped to different thresholds that correspond to respective velocities. The communication module 450 can receive communications from the vehicle control system 400. In some aspects, modules and systems in the infrastructure radar system 442 communicate with each other through the communication module 450.

Figure 5:
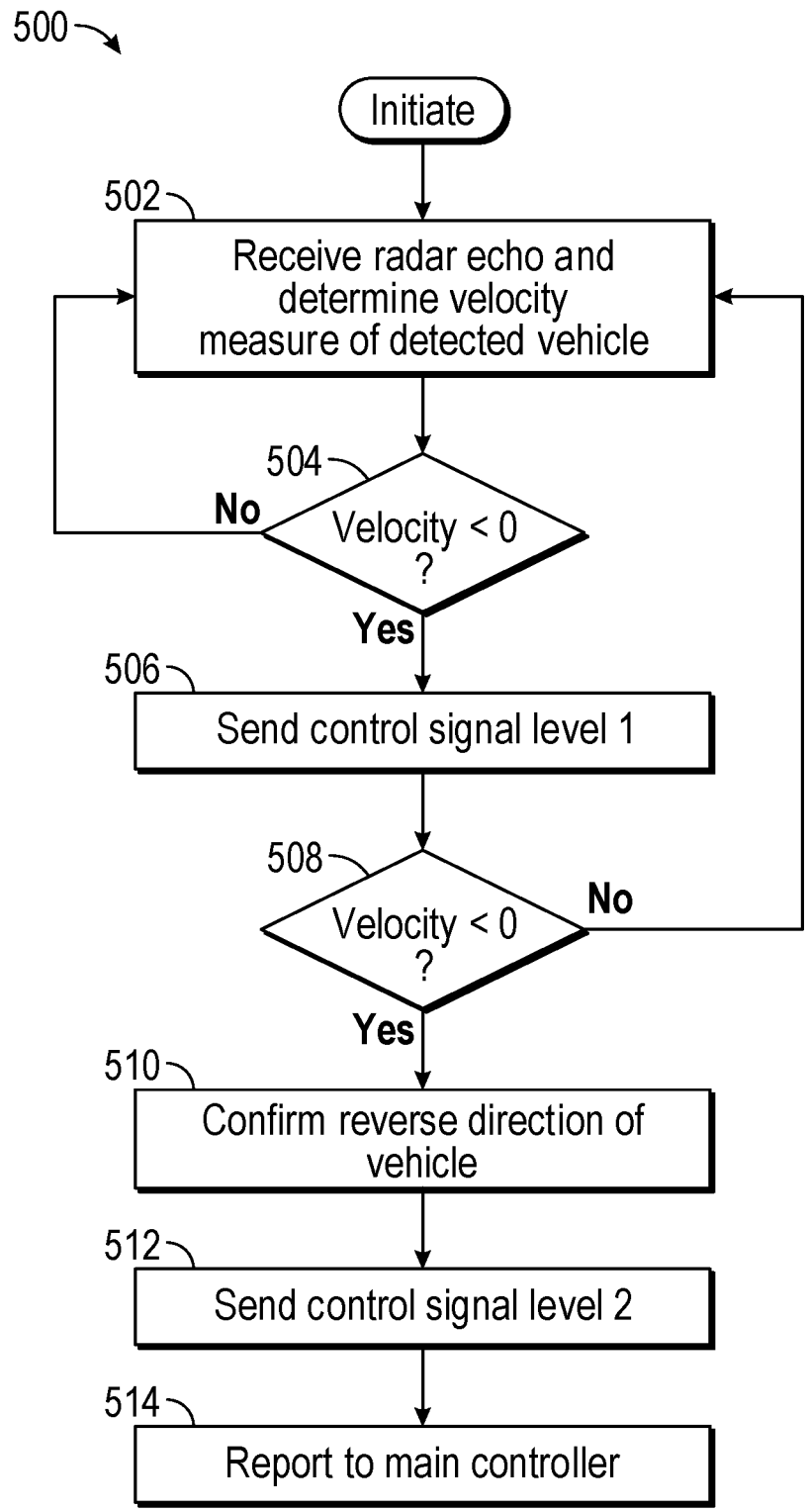
FIG. 5 illustrates a flowchart of an example process of operating an infrastructure radar system, according to various implementations of the subject technology.

FIG. 5 illustrates a flowchart of an example process 500 of operating an infrastructure radar system, according to various implementations of the subject technology. For explanatory purposes, the example process 500 is primarily described herein with reference to the radar unit 444 of FIG. 4; however, the example process 500 is not limited to the radar unit 444 of FIG. 4, and the example process 500 can be performed by one or more other components of the radar unit 444 of FIG. 4 or from a mobile network element, such as a vehicle. Further for explanatory purposes, the blocks of the example process 500 are described herein as occurring in series, or linearly. However, multiple blocks of the example process 500 can occur in parallel. In addition, the blocks of the example process 500 can be performed in a different order than the order shown and/or one or more of the blocks of the example process 500 may not be performed.

The process 500 begins at step 502, where the radar unit 444 of an infrastructure element (e.g., infrastructure element 140, 240) receives a radar echo signal and obtains a velocity measurement of a detected vehicle from the received radar echo signal. Next, at step 504, the radar unit 444 determines whether the velocity measurement is lesser than zero. If the velocity measurement is negative (or less than zero), or within a first velocity range, the process 500 proceeds to step 506. Otherwise, the process 500 returns to step 502 to receive a new radar echo signal. At step 506, the radar unit 444 sends a control signal at level 1. In some aspects, the control signal sent at step 506 may be referred to as an alert message of a first priority. This signal may be as described in FIG. 9 or may be otherwise configured to alert other vehicles in the area as quickly as possible. Subsequently, at step 508, the radar unit 444 confirms whether the velocity measurement is lesser than zero, or within the first range. If the velocity is less than zero, the process 500 proceeds to step 510. Otherwise, the process 500 proceeds back to step 502. In some aspects, the step 508 is performed to confirm whether the detected object is indeed a moving vehicle or an object other than a vehicle (e.g., a person) moving at a relatively slow velocity. At step 510, the radar unit 444 confirms the reverse direction of a vehicle by verifying its velocity is less than zero, or within the first range. Next, at step 512, the radar unit 444 sends a control signal at level 2, which is a heightened emergency indicator. In some aspects, the control signal sent at step 512 may be referred to as an alert message of a second priority greater than the first priority. Subsequently, at step 514, the information is reported to a main controller to determine a next action. In some implementations, the control signal level (Level 1, Level 2) is stored along with a time stamp for comparison to later measurements. In some implementations, a control signal with a single level allows the alerted vehicles to make decisions accordingly. For autonomous vehicles, the control signal may include an action for the alerted vehicle to take or the control signal may trigger an aversion process within the autonomous vehicle.

Figure 6:
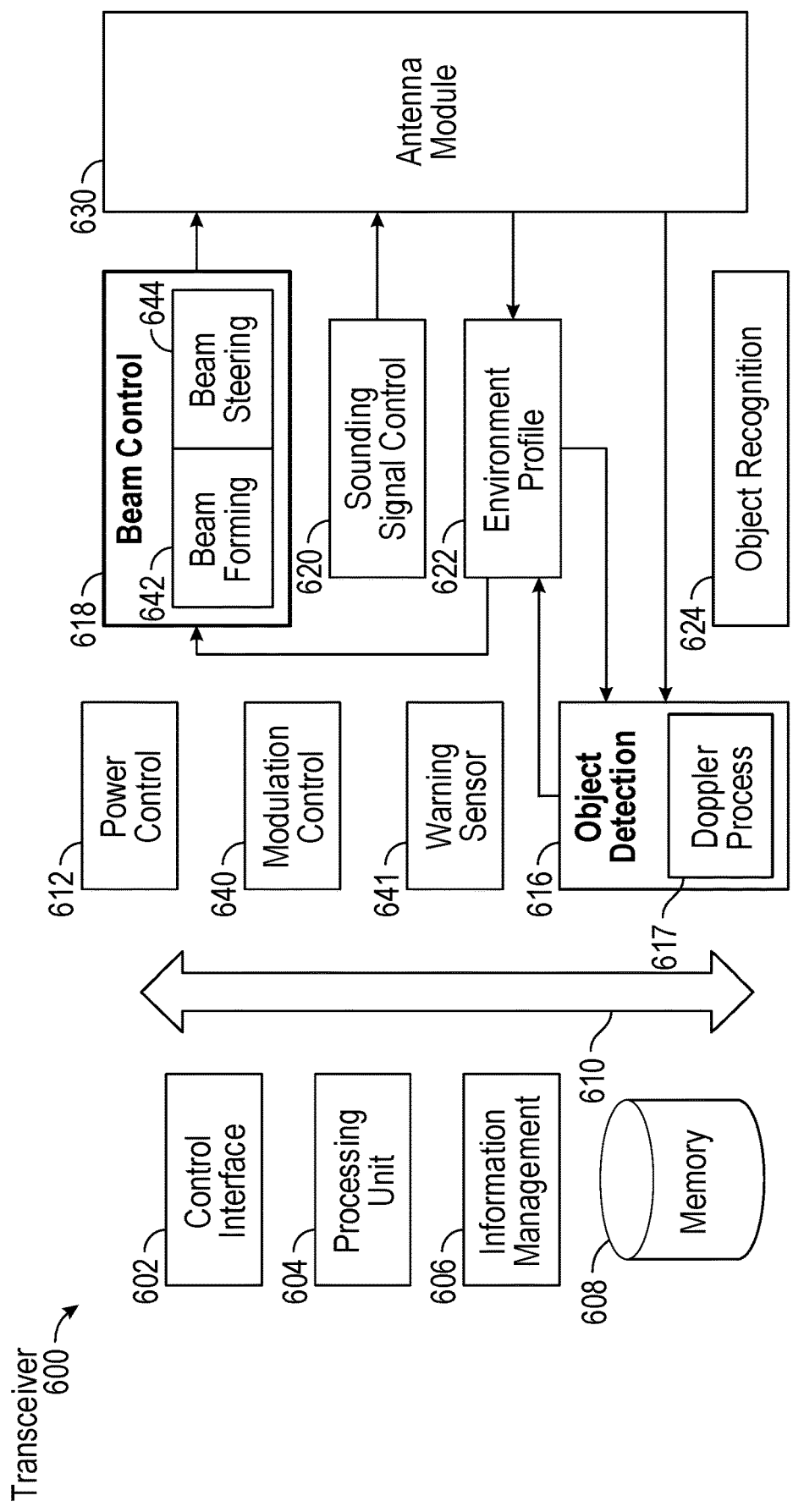
FIG. 6 illustrates a transceiver in a radar unit, according to various implementations of the subject technology.

FIG. 6 illustrates a transceiver 600 in a radar unit, according to various implementations of the subject technology. Not all of the depicted components may be used, however, and one or more implementations may include additional components not shown in the figure. Variations in the arrangement and type of the components may be made without departing from the scope of the claims set forth herein. Additional components, different components, or fewer components may be provided.

In some implementations, the transceiver 600 may be implemented in an infrastructure element and/or a vehicle. When positioned within a vehicle, the vehicle may act as mobile infrastructure detecting vehicles moving against traffic and sending warning signals to emergency personnel and/or other vehicles. The transceiver includes a control interface 602, a processing unit 604, an information management unit 606, a power control unit 612, an object detection unit 616 and an object recognition unit 624. The transceiver 600 also includes a modulation control unit 640 and a warning sensor 641. The transceiver 600 further includes an antenna module 630 controlled by beam control unit 618, which includes beam forming module 642 and beam steering module 644. In this way, the transceiver 600 enables a vehicle to operate in a mobile mode similar to operation of the infrastructure element, whereby the vehicle is able to detect vehicles violating directional rules and alert other vehicles in the vicinity and/or the path of the violating vehicle.

The processing unit 604 controls the information management unit 606 and the control interface 602 for communication with other system controls, such as a sensor fusion in a vehicle. The processing unit 604 can process data exchanged between the various components of the transceiver 600, including the object detection unit 616, beam control unit 618 and the antenna module 630, among others. The power control unit 612 can control the power supplies in the transceiver 600 by controlling the amount of voltage supplied to each of the components in the transceiver 600. The power control unit 612 may control the amount of bias supplied to the modulation control unit 640 and to the beam control unit 618 for facilitating the beam steering operation of the transceiver 600. Communication within the transceiver 600 may be transmitted through the communication module 610. In some aspects, modules and systems in the transceiver 600 communicate with each other through the communication module 610.

The object recognition unit 624 can receive analog data from the antennas and/or the processed data of location, velocity and so forth, and determines an object type therefrom. In some implementations, the object recognition unit 624 includes one or more neural network (NN) processors, such as a convolutional NN (CNN) that trains on known data to match received data to images or object types. The object detection unit 616 includes a Doppler process unit 617. The Doppler process unit 617 uses the received reflection from an object or target to determine a location, velocity and other parameters of the object. This may be done by use of an FMCW signal having a sawtooth, triangular or other wave form.

In some implementations, the object recognition unit 624 works with object detection unit 616 for more clarity as to the object, and the warning sensor 641 determines if any objects are moving directly toward the vehicle having the transceiver. For example, the object detection unit 616 may detect a vehicle traveling in the wrong direction and direct the antenna module 630, at the instruction of the beam control unit 618, to focus additional RF beams at a given phase shift and direction within the portion of the FoV corresponding to the location of the detected vehicle.

The object detection unit 616 may also include a moving object tracker (not shown) to track the identified objects over time, such as, for example, with the use of a Kalman filter. The moving object tracker matches candidate targets identified by the object recognition unit 624 with targets it has detected in previous time windows. By combining information from previous measurements, expected measurement uncertainties, and some physical knowledge, the moving object tracker can generate robust, accurate estimates of moving vehicle locations.

The doppler process unit 617 takes a series of RD maps from the antenna module 630 and extracts a doppler signal from them. The doppler signal enables a more accurate identification of targets as it provides information on the occupancy of a target in various directions over time. In this respect, the doppler signal can indicate the change in phase at respective locations of the moving vehicle such that a negative velocity determination can be performed by the objection detection unit 616.

Information on identified vehicles over time are then stored in the environment profile 622, which keeps track of targets' locations and their movement over time as determined by the moving object tracker. The tracking information provided by the moving object tracker and the doppler signal provided by the doppler process unit 617 are combined at the environment profile 620 to produce an output containing the type/class of target identified, their location, their velocity, and so on.

The warning sensor 641 may receive an indication from an infrastructure radar unit or may receive a radar echo indicating a moving object violates the directional rules of the road. The warning sensor 641 may capture the velocity and/or acceleration from the modulated signal and then compare one or both to directional rules. When a violation is found, the warning sensor 641 may also determine a radar cross-sectional area to verify that the moving object is a vehicle. In this way, the vehicle can determine imminent danger in its environment by one or more methods and take corrective action to avoid a collision. The corrective action may be provided to a human driver or may be implemented by an autonomous system that can respond quickly and according to predetermined rules. These rules may update as the vehicle drives to enhance the safety mechanism. Similarly, the transceiver 600 enables a vehicle to become an impromptu real-time radar infrastructure element to identify dangerous conditions on the highway. The vehicle may transmit an alert to other vehicles and to infrastructure elements, including radar infrastructure elements, cellular systems, wireless networks other vehicles, and so forth.

The transceiver 600 also includes a communication module 610, a sounding signal control module 620 and an environment profile 622. The sounding signal control unit 620 is coupled to antenna module 630. The sounding signal control module 620 includes circuitry for generating and transmitting a sounding signal that is added to such a system to provide additional information and assist the vehicle system to create a real time landscape. The information is processed to create the environment profile 622. The environment profile 622 may include environmental data from detections of various conditions in the surrounding environment, such as temperature, humidity, fog, visibility, precipitation, among others. The antenna module 630 is coupled to the modulation control unit 640 and the object detection unit 616 having a doppler process unit 617 to extract reflection information from modulated signals. The modulation control unit 640 can control the type of modulation applied to a transmit signal. In some aspects, the transmit signal may be modulated in frequency or phase.

The transceiver 600 also includes a memory storage unit 608 for storing one or more both of volatile memory data and non-volatile memory data. The memory storage unit 608 can store useful data for the radar unit, such as, for example, information on which subarrays and/or elements of the antenna module 630 perform better under different conditions. The memory storage unit 608 may store information and data (e.g., static and dynamic data) used for operation of the transceiver 600.

In operation, the antenna module 630 scans an environment around a vehicle, in which reflected signals provide indications of positions and velocity, as well as other characteristics of objects. This creates a radar system for enabling the vehicle to understand its surroundings.

Figure 7:
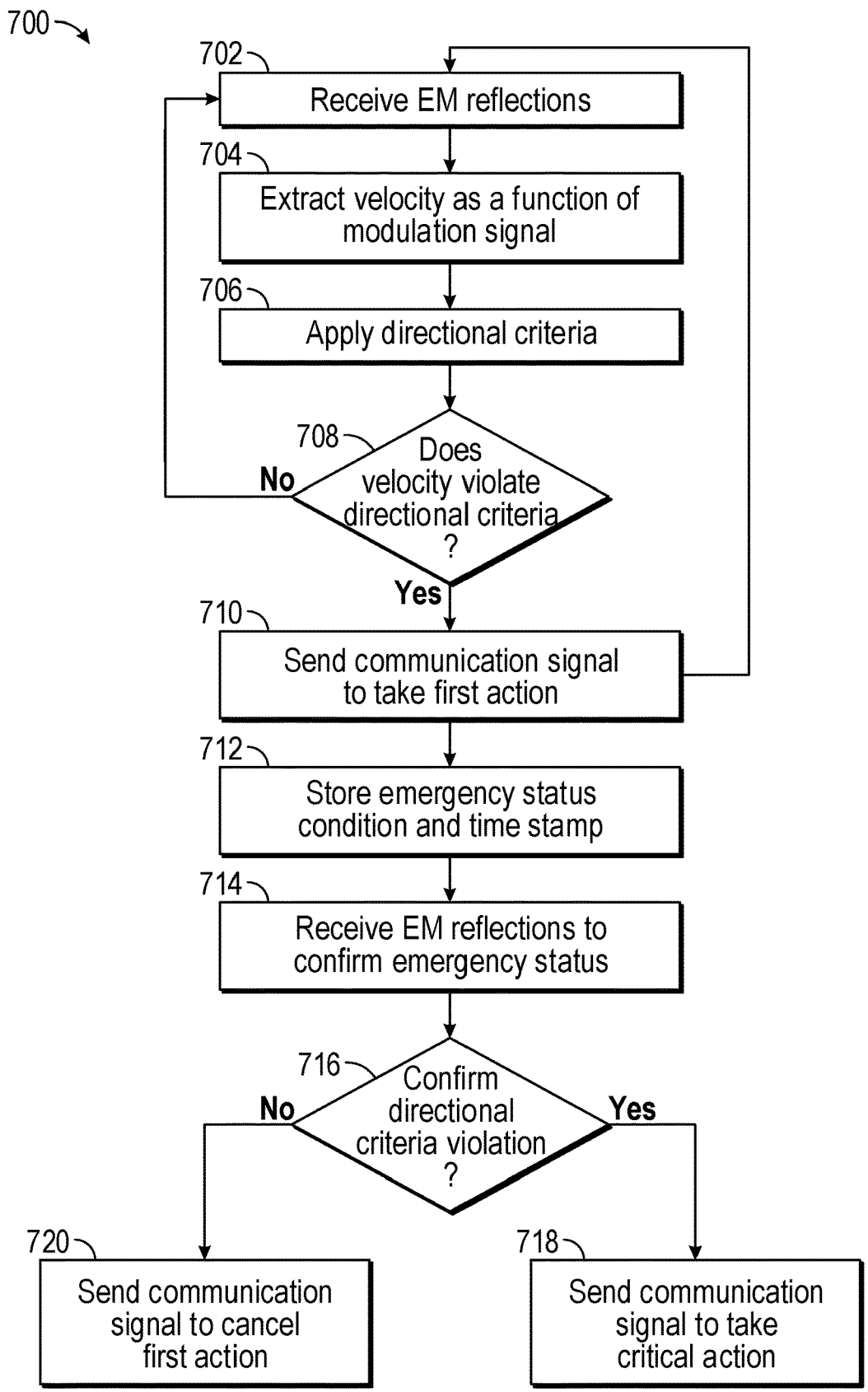
FIG. 7 illustrates a flowchart of an example process of detecting a directional violation as a function of velocity, according to various implementations of the subject technology.

FIG. 7 illustrates a flowchart of an example process 700 of detecting a directional violation as a function of velocity, according to various implementations of the subject technology. For explanatory purposes, the example process 700 is primarily described herein with reference to the radar unit 444 of FIG. 4; however, the example process 700 is not limited to the radar unit 444 of FIG. 4, and the example process 700 can be performed by one or more other components of the radar unit 444 of FIG. 4 or from a mobile network element, such as a vehicle. Further for explanatory purposes, the blocks of the example process 700 are described herein as occurring in series, or linearly. However, multiple blocks of the example process 700 can occur in parallel. In addition, the blocks of the example process 700 can be performed in a different order than the order shown and/or one or more of the blocks of the example process 700 may not be performed.

In some implementations, the process 700 can be used to evaluate a radar echo at an infrastructure element (e.g., 140). The process 700 starts at step 702, where the radar unit 444 in an infrastructure element receives EM reflections. Next, at step 704, the radar unit 444 extracts velocity information as a function of a modulation signal associated with the received EM reflections. Subsequently, at step 706, the radar unit 444 applies directional criteria to determine a direction of vehicles traveling in the vicinity. Next, at step 708, the radar unit 444 determines whether the velocity violates the directional criteria. If the velocity is determined as violating the directional criteria, then the process 700 proceeds to step 710. Otherwise, the process 700 returns to step 702 to receive new EM reflections. At step 710, the communication module 450 in the radar unit 444 sends a communication signal to a vehicle that triggers or prompts the vehicle to execute a first action. Subsequently, at step 712, the radar unit 444 stores an emergency status condition and associated time stamp in a memory (e.g., 608). Next, at step 714, the radar unit 444 of the infrastructure element receives further EM reflections to confirm the emergency status. The infrastructure element may receive the further EM reflections in response to additional chirp signals transmitted by the radar unit of the infrastructure element. The operation at step 714 may be triggered by the need to confirm whether the detected object is indeed a moving vehicle or a person (or other non-vehicle object) moving at a relatively low velocity. Subsequently, at step 716, the radar unit 444 confirms whether the directional criteria has been violated. If the directional criteria violation is confirmed, the process 700 proceeds to step 718. At step 718, the transceiver (e.g., 600) of the radar unit 444 sends a communication signal that instructs the receiving vehicle to execute an emergency action. Otherwise, the process 700 proceeds to step 720, where the transceiver (e.g., 600) of the radar unit 444 sends a cancellation message to the receiving vehicle to cancel (or withdraw) execution of the first action, when the directional criteria violation is not confirmed.

Figure 8:
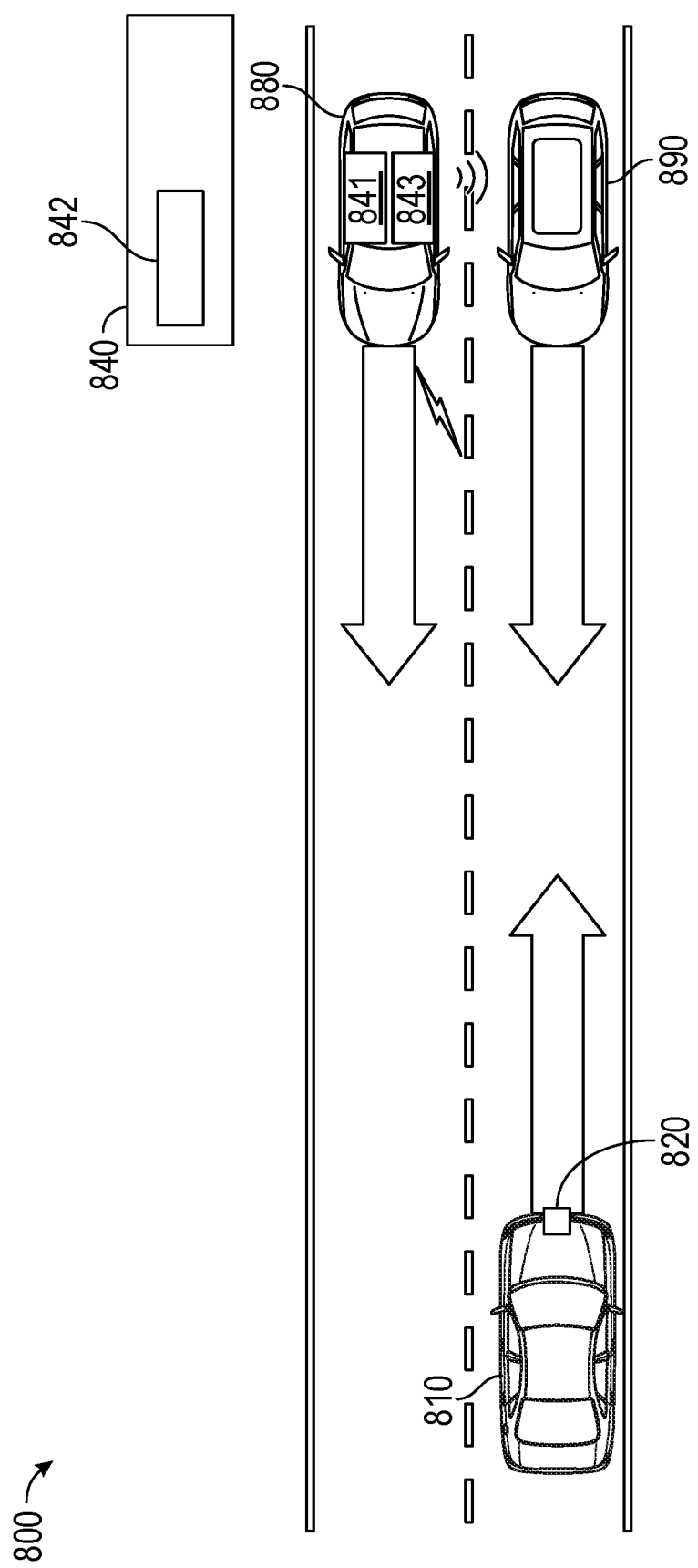
FIG. 8 conceptually illustrates a vehicle acting as a mobile infrastructure element, according to various implementations of the subject technology.

FIG. 8 conceptually illustrates a vehicle 880 acting as a mobile infrastructure element, according to various implementations of the subject technology. The vehicle 880 includes a radar unit 843 and a communication unit 841. The radar unit 843 is adapted to identify vehicles that violate directional road rules, such as vehicle 890, which is traveling on the wrong side of the highway and is directed into on-coming traffic, such as vehicle 810. The vehicle 880 detects vehicle 890 by comparing the received radar echoes to directional criteria. Once a violation is identified based at least on the comparison between the received radar echoes and the directional criteria, the vehicle 880 determines that the detected violation represents a dangerous condition on the highway and sends an alert to the vehicle 810 by way of the communication unit 841. The alert may be sent out as a broadcast signal across a broad area, or may be sent to specific recipients, such as vehicle 810 through communication unit 820, vehicle 890 and/or infrastructure element 840 through communication unit 842. For example, the vehicle 880 may be in communication with the vehicle 810 over a communication channel associated with a wireless communication network (e.g., V2V communication network, cellular 5G, wireless LAN, or the like). The alert enables drivers, vehicles, emergency personnel and/or infrastructure to respond to the alert. In some implementations, where there is sufficient warning, the highway infrastructure system may implement a deterrent, such as spikes in a road or a roadblock. In some aspects, the alert triggers a broadcast message on billboards, where messages indicate actions for drivers and alert them to the danger.

Figure 9:
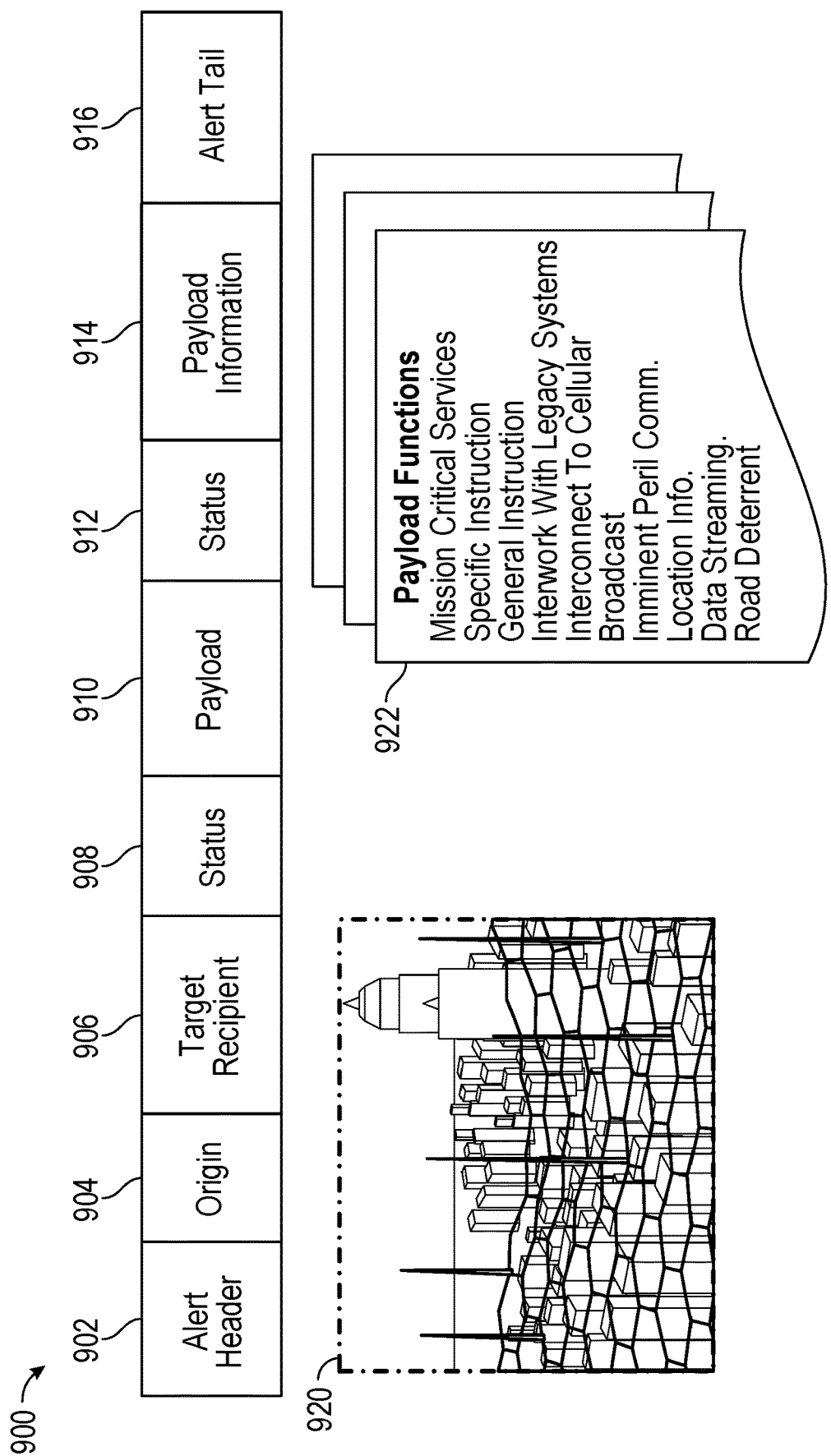
FIG. 9 illustrates a schematic diagram of a packet format for a communication protocol for a vehicular warning system, according to various implementations of the subject technology.

FIG. 9 illustrates a schematic diagram of a packet format 900 of a communication protocol for a vehicular warning system, according to various implementations of the subject technology. An alert message, in connection with alerting other vehicles about an impending traffic emergency on a roadway, may be transmitted in a variety of ways. In some aspects, the alert message is transmitted in accordance with the packet format 900. The packet format 900 includes various fields for communication over one or more communication channels. The packet format 900 includes an alert header field 902, an origin field 904, a target recipient field 906, a status field 908, a payload 910, a status field 912, a payload information field 914, and an alert tail field 916. Not all of the depicted components may be used, however, and one or more implementations may include additional components not shown in the figure. Variations in the arrangement and type of the components may be made without departing from the scope of the claims set forth herein. Additional components, different components, or fewer components may be provided.

The alert header field 902 and the alert tail field 916 can identify the bounds of the message. The origin field 904 (or source field) identifies the detection point, and the target recipient field 906 may be a specific infrastructure unit or may indicate a broadcast or multicast communication. The status field 908 indicates the condition, which may be coded to identify an accident, a vehicle traveling the wrong way, and so forth. The payload 910 contains the message (or content) relating to the alert message. The status field 912 indicates a status of the alert message. The payload information field 914 indicates additional information 922, in which such information may include mission critical service information, specific instruction or action, general instruction or action, interwork details for legacy systems, interconnect information for cellular system, broadcast details, imminent peril communication details, location, data streaming information, road deterrent and so forth. The protocol and messaging enable an impromptu network structure 920 to cover a prescribed area, a large area, complementary areas and so forth.

It is also appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Furthermore, to the extent that the term "include," "have," or the like is used in the description or the claims, such term is intended to be inclusive in a manner similar to the term "comprise" as "comprise" is interpreted when employed as a transitional word in a claim.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate implementations can also be implemented in combination in a single implementation. Conversely, various features that are described in the context of a single implementation can also be implemented in multiple implementations separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. Moreover, the separation of various system components in the aspects described above should not be understood as requiring such separation in all aspects, and it should be understood that the described program components and systems can generally be integrated together in a single hardware product or packaged into multiple hardware products. Other variations are within the scope of the following claim.

What is claimed is:

1. An infrastructure element positioned proximate to a roadway, comprising:
   a radar unit comprising an antenna module and a perception engine to control beam steering of the antenna module, the radar unit configured to:
      produce radar data from one or more return radio frequency (RF) beams reflected from a surrounding environment using one or more steerable RF beams radiated from the antenna module to the surrounding environment, wherein the antenna module is configured to determine parameters of the one or more steerable RF beams during a guidance of the perception engine and achieves beam steering in various directions within a scan angular range;
      detect a moving object in a path of the surrounding environment from the radar data with the perception engine;
      determine whether the moving object in the path is violating directional criteria; and
      generate an alert message notifying one or more receiving units to avoid the path of the moving object when the moving object in the path is violating the directional criteria; and
   a communication unit coupled to the radar unit and configured to send the alert message to the one or more receiving units in the surrounding environment.

2. The infrastructure element of claim 1, wherein the radar unit comprises:
   a velocity compare module configured to:
      perform a comparison between a velocity of the detected moving object and a predetermined threshold;
      determine whether the velocity of the detected moving object is a compliant velocity or a non-compliant velocity from the comparison; and
      determine that the moving object is violating the directional criteria when the velocity is a negative velocity.

3. The infrastructure element of claim 1, wherein the radar unit is further configured to:
   extract the velocity as a function of a modulated signal from the radar data;
   determine whether the extracted velocity is lesser than zero; and
   determine that the moving object is violating the directional criteria when the extracted velocity is lesser than zero.

4. The infrastructure element of claim 1, wherein the radar unit is further configured to:
   obtain a velocity measurement of the moving object from the radar data;
   determine that the velocity measurement does not satisfy the directional criteria; and
   generate the communication signal with a first priority that corresponds to a first preventative action.

5. The infrastructure element of claim 4, wherein the radar unit is further configured to determine that the velocity measurement corresponds to the first preventative action from a mapping between a plurality of actions and velocity measurements of the moving object.

6. The infrastructure element of claim 4, wherein the radar unit is further configured to:
confirm whether the velocity measurement is lesser than zero, or within the first range of velocities;
send a second communication signal indicating a second alert message with a second priority different from the first priority when the velocity measurement is confirmed, the second alert message causing the one or more receiving units to perform a second action with more urgency than the first action; and
send a third communication signal that instructs the one or more receiving units to cancel the first action when the velocity measurement is not confirmed.

7. A radar system in an infrastructure element, comprising:
an antenna module comprising one or more meta-structure antennas that are configured to radiate one or more transmission radio frequency (RF) beams to a surrounding environment and receive one or more return RF beams reflected from a moving object in the surrounding environment;
a perception engine, wherein the antenna module is configured to determine parameters of the one or more transmission RF beams during a guidance of the perception engine;
an object detection unit configured to detect the moving object and control beam steering of the antenna module to focus on a specific area of a field of view (FoV) within a scan angular range;
a directional criteria evaluation unit configured to extract a velocity of the moving object and determine whether the moving object is violating directional criteria; and
a communication unit coupled to the radar unit and configured to send an alert message to one or more receiving units in the surrounding environment, the alert message notifying the one or more receiving units of a traffic condition status based at least on whether the moving object is violating the directional criteria.

8. The radar system of claim 7, further comprising a velocity compare module configured to:
perform a comparison between the velocity of the moving object and a predetermined threshold;
determine whether the velocity of the detected moving object is a compliant velocity or a non-compliant velocity from the comparison; and
determine that the moving object is violating the directional criteria when the velocity is a non-compliant velocity.

9. The radar system of claim 7, wherein the directional criteria evaluation unit is further configured to:
determine whether the velocity is lesser than zero; and
determine that the moving object is violating the directional criteria when the velocity is lesser than zero.

10. The radar system of claim 7, wherein the directional criteria evaluation unit is further configured to:
obtain a velocity measurement of the moving object from the radar data;
determine that the velocity measurement does not satisfy the directional criteria; and
generate the communication signal with a first priority that corresponds to the first preventative action.

11. The radar system of claim 10, wherein the directional criteria evaluation unit is further configured to determine that the velocity measurement is lesser than zero based at least on a comparison to the directional criteria.

12. The radar system of claim 10, wherein the directional criteria evaluation unit is further configured to determine that the velocity measurement is not within a first range of velocities based at least on a comparison to the directional criteria, the first range of velocities comprising compliant velocities.

13. The radar system of claim 10, wherein the directional criteria evaluation unit is further configured to determine that the velocity measurement corresponds to the first action from a mapping between a plurality of actions and velocity measurements of the moving object.

14. The radar system of claim 10, wherein the directional criteria evaluation unit is further configured to:
confirm whether the velocity measurement is lesser than zero, or within the first range of velocities;
send a second communication signal indicating a second alert message with a second priority different from the first priority when the velocity measurement is confirmed, the second alert message causing the one or more receiving units to perform a second action with more urgency than the first action; and
send a third communication signal that instructs the one or more receiving units to cancel the first action when the velocity measurement is not confirmed.

15. A method of operating a radar system in an infrastructure element, the method comprising:
directing a beam steering antenna structure to generate one or more radio frequency (RF) beams and radiate the one or more RF beams to a surrounding environment;
producing radar data from one or more return RF beams reflected from the surrounding environment;
determining parameters of the one or more RF beams during a guidance of a perception engine;
detecting a moving object in a path of the surrounding environment from the radar data;
controlling the beam steering of the beam steering antenna structure based on the detection of the moving object, wherein controlling includes focusing on a specific area of a field of view (FoV) within a scan angular range;
determining whether the moving object in the path is violating directional criteria; and
sending a communication signal to one or more receiving units in the surrounding environment when the moving object in the path is violating the directional criteria, the communication signal indicating an alert message that notifies the one or more receiving units to perform a first preventative action that causes the one or more receiving units to avoid the path of the moving object.

16. The method of claim 15, further comprising:
obtaining a velocity measurement of the moving object from the radar data;
determining that the velocity measurement does not satisfy the directional criteria; and
generating the communication signal with a first priority that corresponds to the first preventative action.

17. The method of claim 16, wherein determining that the velocity measurement does not satisfy the directional criteria comprises determining that the velocity measurement is lesser than zero.

18. The method of claim 16, wherein determining that the velocity measurement does not satisfy the directional criteria comprises determining that the velocity measurement is not within a first range of velocities, the first range of velocities comprising compliant velocities.

19. The method of claim 16, further comprising determining that the velocity measurement corresponds to the first action from a mapping between a plurality of actions and velocity measurements of the moving object.

20. The method of claim 16, further comprising:
confirming whether the velocity measurement is lesser than zero, or within the first range of velocities;
sending a second communication signal indicating a second alert message with a second priority different from the first priority when the velocity measurement is confirmed, the second alert message causing the one or more receiving units to perform a second action with more urgency than the first action; and
sending a third communication signal that instructs the one or more receiving units to cancel the first action when the velocity measurement is not confirmed.

* * * * *